Jan. 19, 1965 R. W. ROBERTS 3,165,892
SMALL CAR TRANSMISSION
Filed July 23, 1963 2 Sheets-Sheet 1
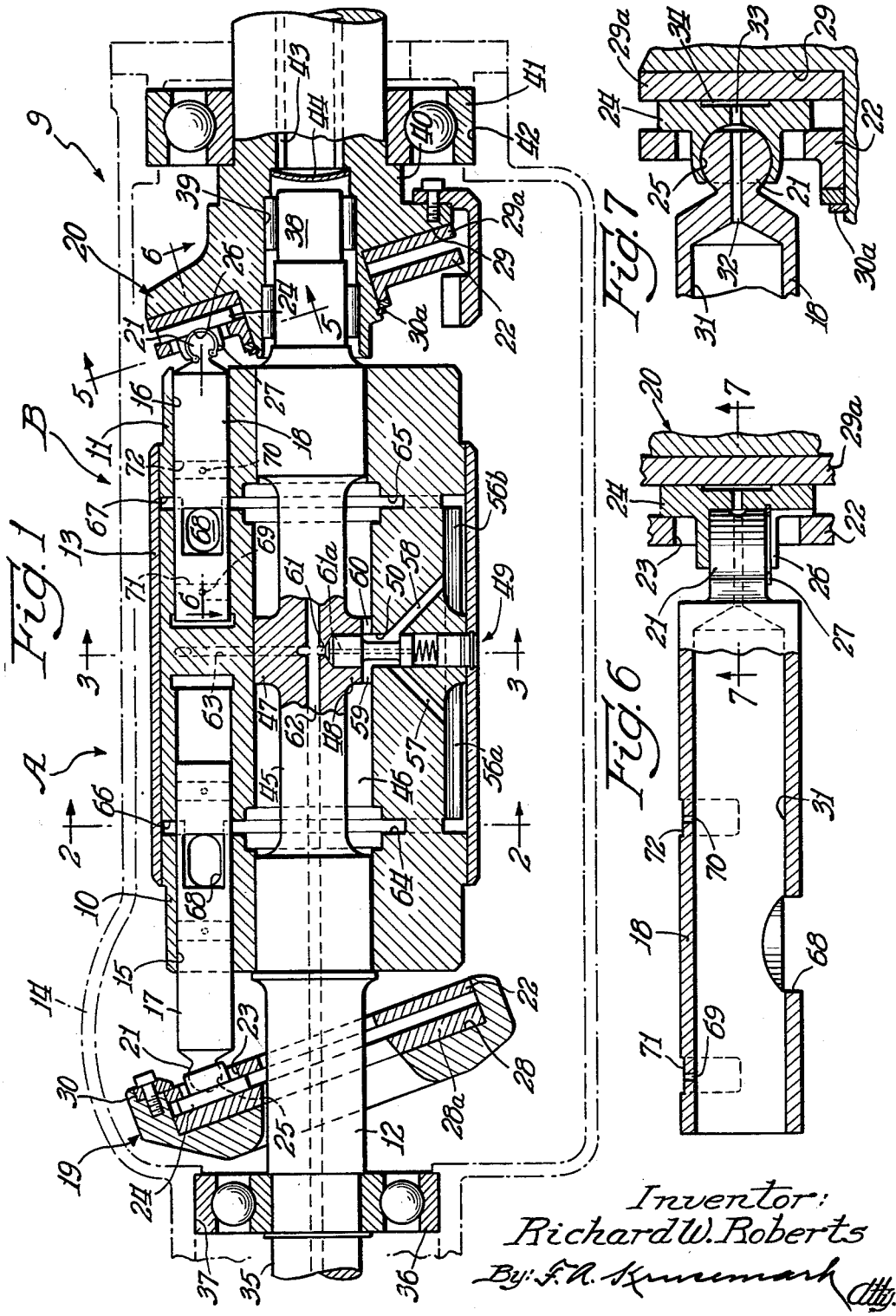
Inventor:
Richard W. Roberts
By: F. R. Krusemark Atty.

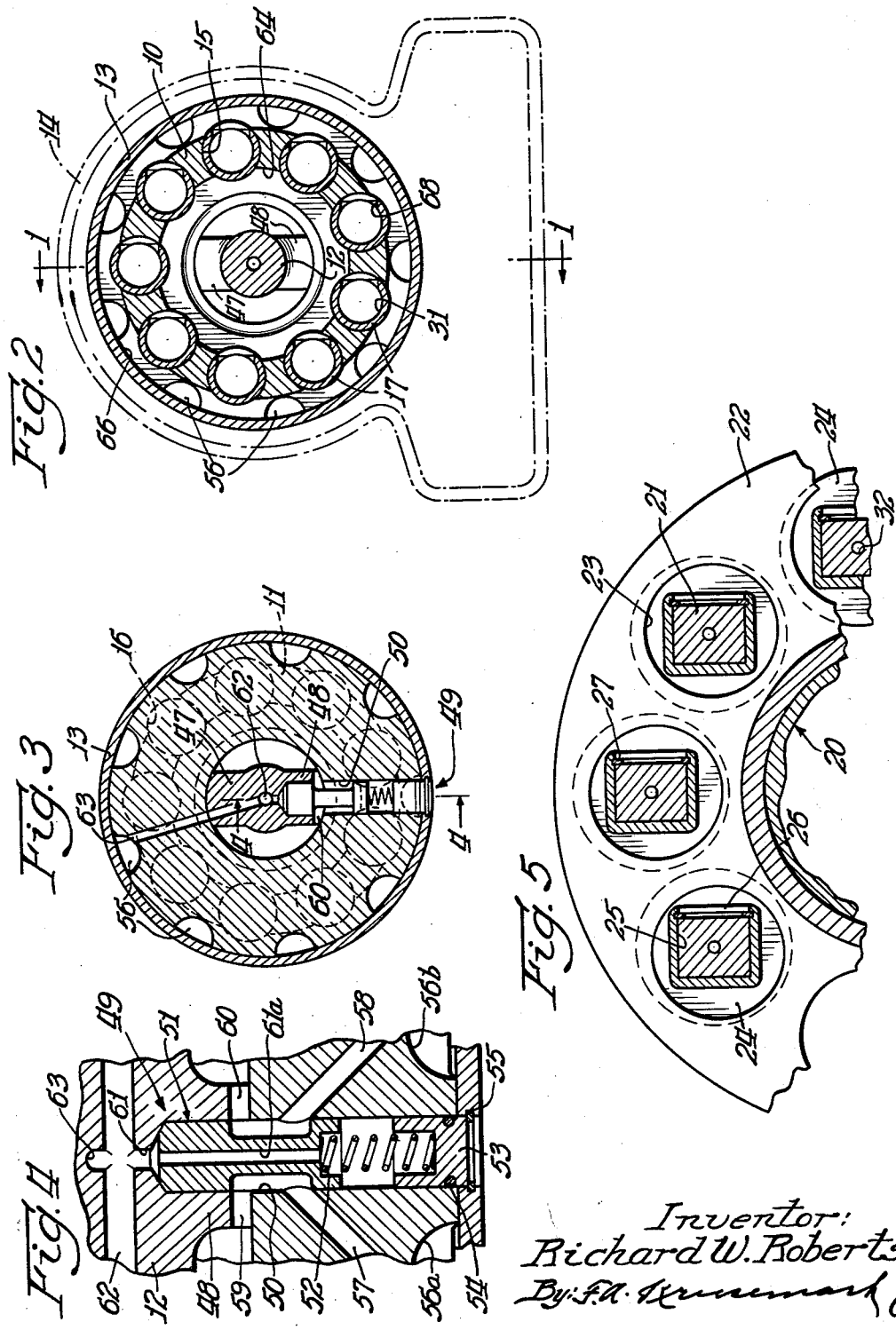

3,165,892
SMALL CAR TRANSMISSION
Richard W. Roberts, Lombard, Ill., assignor to Borg-Warner Corporation, Chicago, Ill., a corporation of Illinois
Filed July 23, 1963, Ser. No. 297,077
9 Claims. (Cl. 60—53)

The present invention is an apparatus adapted to serve as an infinitely variable hydrostatic transmission and, more particularly, to a transmission of the axial piston, case reactive type, with both cylinder bodies constructed integral with the input or output shaft. In this disclosure the cylinder bodies are shown connected to the input shaft.

The present invention differs from the conventional systems, primarily, in that it uses piston control porting rather than the conventional port plates. Porting is integral with both the pistons and the cylinder block. Port timing is controlled by the port widths and rotation of the pistons within the cylinder bore. Piston rotation is forced by the angularity of the fixed swash plate together with the cylindrical slipper bearing. A variable swash plate, as its name indicates, provides means whereby the speed ratio of the transmission according to the present invention may be varied. The cylinder block is rough bored from suitable material, such as cast iron and the flow ports and the flow passages are machined therein. A shaft and outer sleeve are then press-fitted with respect to the casting and brazed in place to enclose the flow passages. The cylinders are then finished to size. This procedure and features of the present invention provide for low cost and economical production.

It is, therefore, an important object according to the present invention to provide an infinitely variable hydrostatic transmission wherein the porting is integral with the pistons and the cylinder block.

It is another important object of the present invention to provide a transmission wherein one of a pair of swash plates is variable.

It is a further object of the present invention to provide an infinitely variable hydrostatic transmission wherein the cost of production is low.

The invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

FIGURE 1 is a longitudinal cross section view of a hydrostatic transmission according to the present invention;

FIGURE 2 is a cross section taken on line 2—2, FIGURE 1;

FIGURE 3 is a cross section taken on line 3—3, FIGURE 1;

FIGURE 4 is a cross section, enlarged, taken on line 4—4, FIGURE 3;

FIGURE 5 is a cross section, enlarged, taken on line 5—5, FIGURE 1;

FIGURE 6 is a cross section, enlarged, of the cylinder, piston, slipper, piston return plate and swash plate, taken on line 6—6, FIGURE 1; and FIGURE 7 is a cross section taken on line 7—7, FIGURE 6.

Like characters of reference designate like parts in the several views.

Referring now to FIGURE 1, a transmission unit 9 according to the present invention is shown which comprises integral cylinder blocks 10 and 11 integral with an input shaft 12 and a sleeve 13 enclosed within a case 14. The cylinder blocks 10 and 11 are provided with spaced cylindrical bores in axial arrangement around a common center which constitute two groups of cylinders 15 and 16, respectively, within which two groups of pistons 17 and 18, respectively, are operably disposed in said cylinders 15 and 16, respectively, and connected to a variable swash plate 19 pivotally mounted in the case 14 and a fixed angle swash plate 20, respectively. The variable swash plate 19 being journaled (not shown) in the case 14. Each of the cylinder blocks 10 and 11 with their respective components, serve as a pump or a motor, depending upon whether the transmission according to the present invention is in forward or reverse, as hereinafter more fully explained. For convenience, the cylinder block 11 with its components will be designated as Unit A and cylinder block 11 with its components will be designated as Unit B.

In order to effect a connection between the pistons and the respective swash plates, each piston is provided with a cylindrical head 21, over which a pair of piston return rings 22, one for each group of pistons, are assembled by means of openings 23 therein. Slippers 24 having cylindrical bores 25, which match the cylindrical heads 21 of the pistons are provided with a cut-away portion 26 so that the slippers 24 may be assembled over the cylindrical heads 21 and locked into position with a retaining ring 27. With the components thus assembled the piston return rings 22 are mounted within annular recesses 28 and 29 of the swash plates 19 and 20, respectively, which bear against hardened wear plates 28a and 29a, respectively, and are held in position by clamps 30. This unique method of connecting the slippers and pistons provides a single axis joint as against the conventional practice of using a ball and socket joint and thus keeps all of the pistons oriented in the same direction. The group of pistons 17 and 18 are provided with cylindrical bores 31 which are in communication with fluid passages 32 extending through the cylindrical heads 21. The slippers 24 are provided with fluid passage ports 33 and recessed areas 34 within their faces which serve as fluid bearings. The input shaft 12, at its input end 35, is supported by a bearing 36 mounted within a bore 37 of the case 14. The opposite end 38 of the shaft 12 is journaled within a bore 39 of the fixed angle swash plate 20 which is provided with an output hub 40 supported by a bearing 41 mounted within a bore 42 of the case 14. The output hub 40 is provided with a splined bore 43 for receiving an output shaft not shown. A plug 44 is provided between the bore 39 and the splined bore 43 to prevent fluid loss. It should be noted that the output hub 40 could serve as the input, thereby making the input shaft 12 the output.

The medial area of the input shaft 12 has a reduced diameter 45 which thereby provides an annular fluid chamber 46 within the inner periphery of the cylinder blocks 10 and 11 which may be designated as the high pressure fluid area. This chamber functions as the high pressure interconnecting flow passage between the A and B units for the normal mode of operation. The reduced diameter 45 is provided with opposing radially extending lugs 47 and 48 at its mid area, which at their outer extremities, are brazed integral with the cylinder blocks 10 and 11.

A neutral valve 49 is provided in the area between the integral cylinder blocks 10 and 11 and extends into one of the lugs 47 or 48; in this instance, lug 48. The neutral valve 49 comprises a cylindrical bore 50 having a spool valve 51 operable therein which is urged against the innermost end of the cylindrical bore 50 by a spring 52 that is biased against a cylindrical plug 53 having an O-ring 54 for preventing fluid loss, and is locked in position by a retaining ring 55.

Between the outer peripheries of the integral cylinder blocks 10 and 11 and the sleeve 13 equally spaced longitudinal grooves 56 are provided which extend continuously over the major portion of the areas occupied by the two groups of cylinders except where normally a continuous groove would be provided, interruption is caused by the neutral valve 49 with the result that a longitudinal groove 56a and a longitudinal groove 56b are provided on opposite sides of the neutral valve 49. The longitudinal grooves 56 serve as low pressure inter-connecting flow passages between the A and B units in the normal mode of operation. The longitudinal grooves 56, 56a, and 56b may be designated as the low pressure fluid area.

Fluid passages 57 and 58 interconnect the cylindrical bore 50 with longitudinal grooves 56a and 56b, respectively. The cylindrical bore 50 is also in communication with the annular fluid chamber 46 by fluid passages 59 and 60. The inner end of the cylindrical bore 50 is provided with a fluid port 61 in intercommunication between a fluid passage 61a extending longitudinally through the spool valve 51 and a shaft fluid passage 62 which has a source of fluid pressure, not shown. One of the longitudinal grooves 56 is interconnected with the shaft fluid passage 62 by a fluid passage 63.

Annular stepped grooves 64 and 65 are provided in the inner peripheries of the interconnected cylinder blocks 10 and 11, respectively, thereby providing high pressure ports in the groups of cylinders 15 and 16, respectively.

In the outer peripheries of the integral cylinder blocks 10 and 11, annular grooves 66 and 67, respectively, are provided which intersect the longitudinal grooves 56 and 56a and 56b, and also intersect the groups of cylinders 15 and 16, respectively, thereby providing low pressure ports in the cylinders.

Each of the pistons is provided with a relatively large piston port 68 in communication with the cylinder bore 31 and directly on the opposite side of the piston is a pair of relatively small ports 69 and 70 located in recessed areas 71 and 72, respectively and axially spaced from the relatively large port 68 which serves to provide fluid pressure against the piston on that side to thereby balance the piston against the load on the opposite side of the piston resulting from the pressure acting through the piston port 68.

Generally, in the case of reactive transmissions considerably complexity arises from the necessity of timing the two port plates with their respective swash plates. This frequently requires the use of concentric power shafts and imposes difficult sealing and pressure balancing problems in the fluid transfer passages, as well as deflection and bearing problems with the heavily loaded shafts.

In the present invention, the piston ports are operably associated with flow passages and ports that are integral with the integrally constructed shaft and cylinder blocks and port timing is controlled by the port widths and the rotation of the piston within the cylinders. Piston rotation is forced by the angularity of the swash plates together with the single axis joint between the piston heads and the slippers as is apparent from the drawings.

It should be noted that barring losses and compressibility of oil that the flow of fluid of both the A and B units is equal at all times. Therefore, if the A unit swash plate 19 is set to give the same piston stroke as the B unit swash plate 20, the speed of the A unit relative to ground (the case 14) and the speed of the B unit relative to the output hub 40 are equal, wherefore the output hub 40 is stationary. This constitutes the neutral position of the transmission as shown in FIGURE 1.

In operation, starting from neutral position, and advancing the variable swash plate 19 toward vertical, by conventional means not shown, decreases the displacement of Unit A, which in order to satisfy the flow requirements causes a proportionate decrease in the speed of the B unit relative to the output hub 40, thereby causing the output hub 40 to rotate.

As the variable swash plate 19 is advanced further toward a vertical position the rotative speed of the hub 40 is increased proportionately to the further reduced displacement in Unit A until zero displacement is reached at which a hydraulic lockup is achieved and the transmission is at a speed ratio of 1 to 1. This, however, cannot quite be achieved in the present invention because at the vertical position of the swash plate 19, the pistons in Unit A could move, rotation-wise, thereby losing the direction of correct orientation with respect to piston ports. A stop means, not shown, is provided to limit the advancement of the swash plate 19, just short of vertical, which prevents the possible occurrence referred to above and to all intents and purposes is equivalent to a hydraulic lockup.

Specifically, with regard to the flow passages and ports in the system, and the flow of fluid therethrough, hydraulic fluid is provided by conventional means, not shown, through the shaft fluid passage 62 which is in communication with the low pressure side of the system by way of fluid passage 63. Intercommunication between the groups of cylinders 15 and 16 and the annular fluid chamber 46, is provided by the annular stepped grooves 64 and 65, respectively, thereby providing cylinder ports which are operably associated with the relatively large piston ports 68; the timing with reference to these ports is controlled by their location and width, the width of the cylinder ports and the rotation of the pistons within the cylinders, which is induced by the single axis joint connection between the slippers and the piston heads.

When rotative movement of the output hub 40 is induced by advancing the variable swash plate 19 toward vertical position, pressure is built up in the system. As the pistons move within the cylinders, the hydraulic fluid under pressure is discharged from the B unit through ports 68 and the high pressure cylinder ports provided by the annular stepped grooves 65, and into the annular fluid chamber 46. The high pressure fluid flows through the passage 46, and the ports 64 and 68 into the A unit cylinder, forcing the pistons outward. On the inward stroke of the A unit pistons, the fluid is discharged through the piston ports 68 and the high pressure cylinder ports provided by the annular stepped grooves 66 into the low pressure passages 56, thus returning the fluid to the B unit. On the return or intake stroke of the B unit pistons, their rotation causes the large piston ports 68 to face toward the outer periphery of the cylinder blocks, thereby being positioned to receive hydraulic fluid from one or more of the adjacent longitudinal grooves 56 by way of the low pressure cylinder ports provided by the annular groove 67.

The recessed areas 71 and 72 are provided with hydraulic fluid under pressure by way of the small piston ports 69 and 70 thereby providing fluid pressure areas to balance the pressure areas resulting from the areas of ports 68.

Fluid pressure bearings are provided for the slippers by the recessed areas 34 which are provided with fluid under pressure by way of the fluid passages 32 and 33 in the piston heads 25 and the slippers 24, respectively.

When the transmission according to the present invention is in neutral and rotative movement is applied to the input shaft 12, there is a natural tendency for the output hub 40 to rotate because of the normal resistance with respect to fluid movement. This resistance is minimized by the open position of the neutral valve 49 at low r.p.m. which permits the hydraulic fluid to circulate freely between the annular cavity 46 and the longitudinal grooves 56, 56a and 56b by way of fluid passages 57, 58, 59, and 60. However, when rotative movement is increased for operational purposes, centrifugal force on the spool valve 51 overcomes the force of the spring 52 whereby the fluid passages 59 and 60 are closed which cuts off this circulation of hydraulic fluid thus permitting the build up of hydraulic pressure for operational purposes.

In this mode of operation the B unit functions as a pump. The volume of fluid pumped is proportional to the speed difference between the input and output shafts and the pressure is proportional to the output torque. The A unit functions as a motor and returns the energy of the pumped fluid to the input shaft and reduces the torque requirements on the input shaft in accordance with the fundamental transmission equation:

$$ToNo = ETiNi$$

When $E$ = Overall Transmission Efficiency
$To$ = Output Torque $\qquad Ti$ = Input Torque
$No$ = Output Speed, r.p.m. $\qquad Ni$ = Input Speed Reversing the transmission according to the present invention, is obtained by moving the variable swash plate 19 farther away from vertical, from its neutral position. This provides greater displacement in the A unit than in the B unit. The output shaft then turns in a direction opposite that of the input shaft causing the A and B units to change function, hence, the B unit becomes the pump and the A unit the motor which causes the channels 56, 56a, and 56b to become the high pressure side and the annular fluid chamber 46 to become the low pressure side.

It should be noted that the transmission according to the present invention may be operated by applying input rotative power to the shaft connected to the fixed angle swash plate 20 whereby the output shaft becomes the input shaft and vice versa. For output rotation in the same direction, the B unit is the pump and the A unit the motor. In this arrangement the capacity of the A unit is greater than the capacity of the B unit. Therefore the B unit is sized to suit the maximum input torque at the design pressure and the maximum displacement of the A unit is sized to suit the maximum torque ratio at which it is intended to be operate in accordance with the formula $$\frac{T_o}{T_i} - 1 = \text{Displacement ratio}$$

Thus for a unit designed to give a maximum torque ratio of 10:1 the maximum displacement of the A unit should be 9 times the B unit displacement.

All the novel features of the invention, individually or in combination, as illustrated and set forth in the accompanying drawings and specification.

I claim:

1. A fluid apparatus having two groups of axially aligned cylinders in an integral cylinder block comprising in combination:
  (a) high pressure and low pressure ports in each group of said cylinders,
  (b) reciprocable pistons fitted in said cylinders,
  (c) cylindrical bores in said pistons,
  (d) ports in said pistons communicable with said high pressure and low pressure ports,
  (e) a fixed angle swash plate relatively rotatable with respect to one group of said cylinders,
  (f) a variable swash plate operable with respect to the other group of said cylinders,
  (g) flow passages between said high pressure ports,
  (h) flow passages between said low pressure ports, and
  (i) means connecting said pistons to said respective swash plates, said means comprising slippers connected to said pistons by single axis joints.

2. A case reactive infinitely variable transmission operable within a case and having a source of fluid supply, said transmission comprising in combination:
  (a) a piston pump comprising pistons operable in cylinders axially arranged in a first cylinder block,
  (b) a piston motor comprising pistons operable in cylinders axially arranged in a second cylinder block,
  (c) said cylinder blocks being integral and axially arranged with respect to each other,
  (d) an input shaft,
  (e) an output shaft,
  (f) said cylinder blocks being integral with one of said shafts,
  (g) cylindrical bores in said pistons,
  (h) first ports in said cylindrical bores in said pistons, operable in said piston pump,
  (i) second and third ports in said cylinders in said first cylinder block communicable with said first ports,
  (j) fourth ports in said cylindrical bores in said pistons, operable in said piston motor,
  (k) fifth and sixth ports in said second cylinder block communicable with said fourth ports,
  (l) a low-pressure fluid area in the outer periphery of said cylinder block communicable with said third and fifth ports,
  (m) a high-pressure area in the inner periphery of said cylinder blocks communicable with said second and sixth ports,
  (n) a variable swash plate pivotally mounted in said case,
  (o) a fixed angle swash plate supported by a bearing in said case and attached to the other said shaft,
  (p) slippers operably connected to each of said swash plates by piston return rings, one each for each of said swash plates and connected thereto,
  (q) said slippers operably connected to heads of said pistons by single axis joints,
  (r) and a fluid passage extending longitudinally in said input shaft communicable with said source of fluid supply and said low and high pressure fluid areas.

3. A case reactive infinitely variable transmission according to claim 2 wherein the one of said shafts that is integral with the said cylinder blocks is the input shaft and the other said shaft is the output shaft and is connected to the fixed angle swash plate.

4. A case reactive infinitely variable transmission according to claim 2 wherein one of said shafts is connected to the said fixed angle swash plate and is the input shaft and the other of said shaft is integral with the said cylinder blocks and is the output shaft.

5. A case reactive infinitely variable transmission according to claim 2 wherein the outer peripheries of the said pistons are provided with recessed areas each having a port in communication with the said cylindrical bores in the said pistons.

6. A case reactive infinitely variable transmission according to claim 2 wherein a neutral valve is provided which is in fluid communication with the said low and high pressure areas.

7. A case reactive infinitely variable transmission according to claim 2 wherein the said single axis joints comprise cylindrical piston heads operable in matching cylindrical bores in said slippers.

8. A case reactive infinitely variable transmission according to claim 2 wherein the said variable swash plate is provided with a means for changing its angular position with respect to the said pistons connected thereto.

9. A case reactive infinitely variable transmission according to claim 2 wherein the said slippers are provided with recessed areas in their faces which are in fluid communication with the said cylindrical bores in the said pistons.

No references cited.